United States Patent [19]

Ma

[11] Patent Number: 4,535,738

[45] Date of Patent: Aug. 20, 1985

[54] ENGINE CONTROL SYSTEMS

[75] Inventor: Thomas T. Ma, Sth Woodham Ferrers, England

[73] Assignee: Ford Motor Company, Dearborn, Mich.

[21] Appl. No.: 621,823

[22] Filed: Jun. 18, 1984

[30] Foreign Application Priority Data

Jun. 23, 1983 [GB] United Kingdom ............... 8317042

[51] Int. Cl.³ .......................... F02P 5/14; F02D 37/02
[52] U.S. Cl. ...................................... 123/425; 123/435
[58] Field of Search ................................ 125/425, 435

[56] References Cited

U.S. PATENT DOCUMENTS

| | | |
|---|---|---|
| 4,232,545 | 11/1980 | Dobler et al. ................. 123/425 |
| 4,233,943 | 11/1980 | Rogora et al. ................. 123/425 |

FOREIGN PATENT DOCUMENTS

| | | | |
|---|---|---|---|
| 58-25579 | 2/1983 | Japan ................................. 123/425 |
| 2060062 | 4/1981 | United Kingdom ............... 123/425 |
| 2060061 | 4/1981 | United Kingdom ............... 123/425 |

*Primary Examiner*—Andrew M. Dolinar
*Attorney, Agent, or Firm*—Peter Abolins; Robert D. Sanborn

[57] ABSTRACT

The invention relates to a method of engine control, which comprises firing a weak spark through the spark gap, measuring the current through or voltage across the electrodes following the weak spark, analyzing the voltage or current to derive a prediction of the flame propagation speed and subsequently firing a stronger spark through the spark gap to ignite the charge, the timing of the stronger spark being varied in dependence upon the prediction of the flame propagation speed.

3 Claims, 3 Drawing Figures

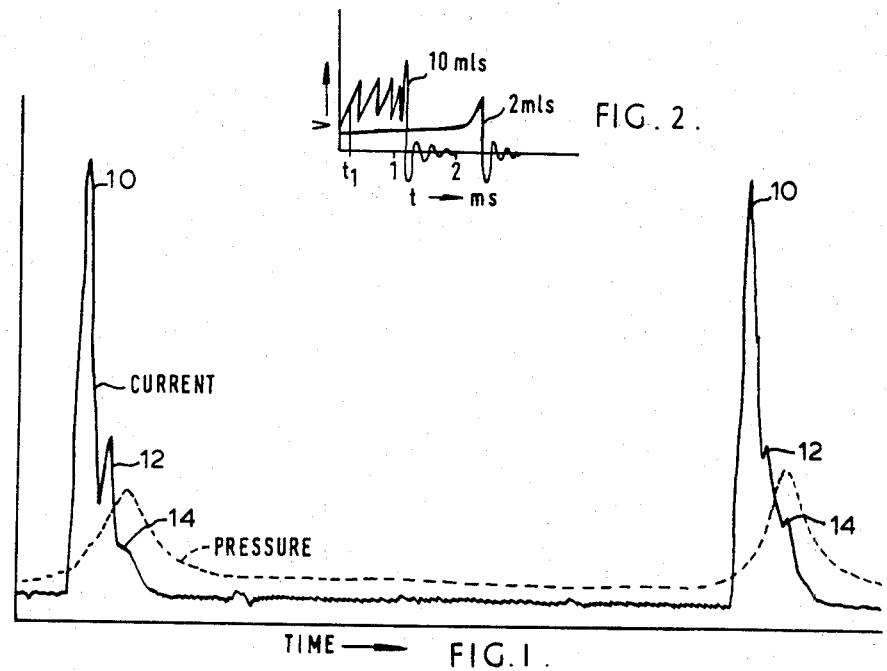
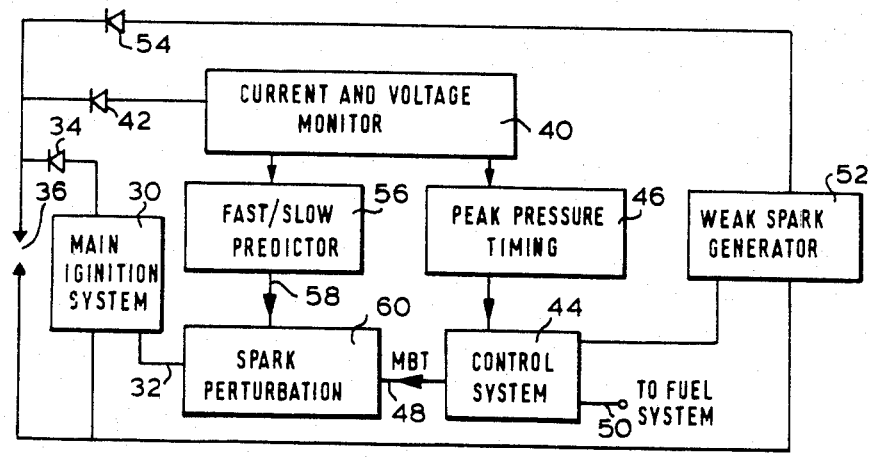

ENGINE CONTROL SYSTEMS

The present invention relates to engine control.

In any internal combustion engine, there is considerable cycle to cycle variation in each combustion chamber and the variations affect the flame propagation speed. As a result of such cycle to cycle variations, it is not possible to tune the engine perfectly and one can only compromise to provide an average setting of the ignition timing and fueling for all cycles. It has recently been discovered that one can predict fast and slow burn cycles by measuring the air speed in the vicinity of the spark plug immediately prior to ignition and it has furthermore been proposed in an earlier European Patent Application No. 83307725.8 that using a feed forward system to perturb the ignition timing one can reduce the cycle by cycle variation and thereby come closer to optimising the setting for all cycles.

The above proposal has required a method of measuring the gas velocity in the vicinity of the spark plug immediately prior to ignition and the above application proposes the use of a hot wire or hot film anemometer. This is likely in itself to give rise to problems on account of the delicate nature of such devices. Also, it is difficult to incorporate such a device within a spark plug and positioning the anemometer in any other way would require the cylinder head to be modified.

The present invention seeks to provide a method of providing an at least approximate prediction of the flame propagation speed in a cylinder which mitigates the above disadvantages.

According to the present invention, there is provided a method of engine control which comprises firing a weak spark through the spark gap, measuring the current through or voltage across the electrodes following the weak spark, analysing the voltage or current to derive a prediction of the flame propagation speed and subsequently firing a stronger spark through the spark gap to ignite the charge, the timing of the stronger spark being varied in dependence upon the prediction of the flame propagation speed.

By firing a weak spark, the resultant spark is blown by the gases moving through the electrode gap and the resultant change in the arc current may be sensed to provide a direct indication of the gas speed in the immediate vicinity of the spark plug. The gas speed measurement is then used to perturb the timing of the main spark in such a manner as to compensate for cycle to cycle variation.

When a very weak spark is fired it should ideally not ignite the mixture whereupon it will have no effect on the engine operation. Should the gases within the combustion chamber be ignited by such a weak spark, there is a very considerable time delay between the time of occurrence of the spark and the time of the peak pressure resulting from combustion. On the other hand, when a powerful spark passes through the spark plug the corresponding time duration is substantially shorter. Thus, it is possible to use a weak spark without adversely affecting the combustion initiated by the main spark since the pressure peak resulting from the main spark though occurring later causes more rapid combustion which overtakes the slower combustion resulting from the weak spark and the weak spark has a negligible effect on the combustion process.

The gas velocity meaurement should be taken as close as possible in time to the instant of firing the main spark in order to predict the gas turbulence at the instant of ignition. This is not possible in view of the time needed to perform the calculations and implement the necessary alterations in spark timing.

In a preferred embodiment of the invention, several weak sparks are fired in a single cycle to obtain several gas velocity readings, the readings being processed to provide by extrapolation an estimate of the gas velocity at the instant of the ensuing main spark. Because several readings are taken, it is possible to ignore spurious signals and to provide more statistically significant predictions of the velocity at the instant of the spark.

Various systems have been proposed in the past for controlling the ignition and/or fueling of a cylinder in dependence upon burn period duration as determined by means of a flame front sensor disposed within the combustion chamber. In one known form of flame front sensor, a pair of electrodes is arranged a distance from the spark plug to act as an ionisation sensor while in other arrangements two pairs of such electrodes are provided in order to measure the propagation speed.

A disadvantage of these known systems is the need to modify the combustion chamber to accept a further device to act as an ionisation sensor and furthermore the sensors proposed in the past have not been sufficiently robust to be able to withstand continual operation.

It has been proposed in GB-PS No. 2060062 to use the spark plug itself to derive a location parameter indicative of the burn period duration. The parameter consists of the timing of a spike on the trailing edge of the ionisation current which flows through the spark after ignition if a relatively low voltage is placed across the spark gap. This parameter is used in the above Patent to control spark timing.

In the preferred embodiment of the invention, there is provided a control system in which the spark plug serves three distinct functions, namely to provide one or preferably several weak sparks in advance of ignition to enable prediction of the variations in the flame propagation speed, to ignite the fuel in the conventional manner, and to act as an ionisation sensor after ignition to measure the actual burn period duration. The prediction of the propagation speed is used to perturb the spark timing about a preset mean ignition timing whereas the actual burn period measurement is used in a closed loop control system to control the air to fuel ratio of the engine. The mean ignition timing is preset and the closed loop varies the fuel to air ratio in such a manner that a location parameter related to peak pressure should match a predetermined target value for the parameter, the target value being stored, for example, in a table in a memory of a microcomputer.

The spike on the trailing edge of the ionisation current curve is believed to be relevant, and to provide a useful location parameter for the following reason. The sharp peak at the commencement of the waveform is caused by the ionisation of the gases on ignition. After termination of spark, the charge commences to burn but the ionisation level builds up gradually as the flame takes in the region of the spark plug. This gradual taking of the flame is the cause of the rising edge of the broad main pulse and the peak of the broad pulse coincides with the most intense flame immediately in the vicinity of the spark plug. In some cases, the flame may take so rapidly that the sharp initial peak may murge with the leading edge of the broad pulse.

Following the maximum combustion rate in the region of the spark plug, the flame propagates and the level of burning in the region of the spark plug decays gradually as the combustion becomes more complete. However, the ionisation current is determined not only by the proportion of the particles that are ionised but also upon the pressure in the combustion chamber and this pressure increases as the flame propagates through the chamber. Therefore the decaying edge of the broad pulse includes the general decay caused by the completion of combustion at the spark plug with a superimposed modulation resulting from the overall pressure within the chamber and it has been found that under most conditions a discernable peak is present on the decaying pulse whose timing coincides accurately with the occurrence of peak pressure in the combustion chamber.

Under some conditions, in particular idling and light load, the amount of pressure variation caused by the combustion is not even sufficient to reverse the downward trend of the decaying broad pulse but nevertheless will cause a point of inflexion or at least a point of minimum slope which may also be detected. Naturally, under these conditions the accuracy of detection may be impaired in particular under noisy operating conditions.

In order to determine an estimate of the timing of the peak pressure, the ionisation current may be analysed in a variety of ways. The above mentioned GB-PS 2060062 suggest determining the first and second order derivatives of the current. It is preferred, however, to subtract from the current an estimated decay curve and then to determine either the first derivative or the centroid of the remaining curve in order to provide the location parameter.

It has also been found when analysing the ionisation current that under knock conditions a high frequency oscillation is superimposed on the trailing edge of the ionisation pulse and this signal may be suitably filtered out and used to provide a knock indication which may in turn result in immediate overiding of the ignition and fuel control system to avoid damage to the engine.

The use of the spark plug as an ionisation sensor offers the additional advantage that it is self-cleaning, whereas separate ionisation sensors tend to develope deposits which eventually affect the values of the ionisation currents which are sensed.

The invention will now be described further, by way of example, with reference to the accompanying drawings, in which:

FIG. 1 is a graph which shows the variation of the current flowing through a spark plug when a weak current is applied to it to monitor the level of ionisation after the spark has occured and shows on the same time scale the pressure variations with time within the same cylinder, FIG. 2 shows the variations in time of the voltage across a spark plug when a weak spark is discharged across the gap, there being shown two graphs for different values of charge velocity, and FIG. 3 is a block circuit diagram of an ignition control system.

In the ignition control system of FIG. 3, there is provided a main ignition system 30 which in response to a triggering voltage received over a line 32 produces a high voltage which is applied by way of an isolation diode 34 to a spark plug 36. The ignition system 30 may be any conventional system, for example a capacitor discharge ignition system or a transistorised ignition system. The spark produced by the main ignition system 30 is responsible for igniting the charge and following ignition a flame propagates through the charge.

A current and voltage monitor 40 applies a low voltage by way of a diode 42 to the spark plug 36 after ignition has occured and monitors the change in current as a function of time.

FIG. 1 shows an example of the variation in current for one cylinder of an engine. The main ignition spark causes a high current spike designated 10 in FIG. 1. This immediately indicates combustion and as the flame takes the degree of ionisation increases and a broad pulse 12 caused by the increase in activity occurs immediately after the sharp spike 10. In some instances, the broad pulse 12 and the sharp spike 10 merge into each other. The peak of the sharp pulse 12 coincides with the maximum ionisation at the spark plug as a result of combustion but this does not coincide with the peak pressure in the cylinder because the flame has yet to propagate away from the spark plug.

As the flame propagates, the level of activity at the spark plug gap decreases and the current generally decays. However, superimposed on this decaying edge of the pulse 12, there is discernable a peak 14 or at least a point of inflexion which forms a hump on the decaying edge of the broad pulse 12 and is believed to be caused by the effect of the varying pressure within the combustion chamber on the current.

In each case, the hump on the decaying edge of the broad pulse 12 coincides precisely with the peak pressure in the combustion cylinder and in the preferred embodiment illustrated in FIG. 3, this hump 14 is detected and used to control the control system 44.

To recognise this feature, a peak pressure timing block 46 stores the data corresponding to the waveform to be analysed in digital form and working backwards from the end of the decaying pulse 12 identifies the first point at which a maximum turning point is present or a point of inflexion. The term "point of inflexion" is being used in a broad sense and it is not necessary that the time derivative of the current should at any time equal zero provided that it passes through a statistically significant local minimum.

A preferred method of signal analysis involves isolating the pressure peak by first subtracting from the entire signal a computed estimate of the decaying edge in the absence of the peak. This estimate can be provided by intrapolation between the values on each side of the discernable peak. The residual signal is then analysed either by determining is first time derivative to indicate the point of minimum rate of change or by evaluating its centre of gravity or more correctly its centroid. These methods offer the advantages of being capable of faster implementation in real time.

The control system 44 therefore receives from the block 46 in FIG. 3 an indication of the actual timing of the peak pressure and in the control system 44 it is compared with a target value of the timing of the peak pressure. An output is produced over a line 50 to control the fueling system in order to increase or decrease the air to fuel ratio, while a predetermined signal for mean best spark timing is sent over the line 48 to the circuit 60.

Within the block 46, the ionisation current is also analysed to detect a high frequency component indicative of engine knocking. This signal is used in the control system 44 to bring about an immediate alteration of the timing in order to avoid damage to the engine.

As has been earlier mentioned, there is considerable cycle to cyle variation in any cylinder and one can predict fast burn or slow burn cycles by determining the charge velocity in the vicinity of the spark plug immediately prior to ignition. In order to achieve this, the system shown in FIG. 3 comprises a weak spark generator 52 which is triggered by the control system 44 shortly before the main ignition system and applies a weak spark through the spark plug 36 by way of an isolation diode 54.

The voltage across the spark plug 36 is monitored by the current and voltage monitor 40 and there is shown in FIG. 2 the voltage variations which occur as a function of time. It will be seen in one case where the charge velocity is 10 m/s the rate of change of the voltage shortly after the weak spark occurs is very high, whereas in the case of the 2 m/s waveform the rate of change is relatively low.

The fast/slow predictor 56 in FIG. 3 measures the rate of change of the voltage at an instant $t_1$, occuring approximately 100 ns after the firing of the weak spark and from this rate of change estimates the charge velocity. This, as has been earlier described, is related to the expected burn period duration and one can use this prediction in a feed forward system to perturb the spark timing to compensate for slower and faster burn cycles.

Thus the output of the fast/slow predictor 56 is applied by way of a line 58 to a spark perturbation block 60 which is a variable delay circuit delaying the triggering of the main ignition system 30 in dependence upon the predicted burn period duration.

The predictor 56 need not necessary measure the rate of change of the voltage since it will be seen that the time of occurrence of the first zero crossing is also markedly different for different charge velocities and this parameter may be used as an alternative to the measurement of the rate of voltage change.

Because of the fact that the generator 52 produces a weak spark, it is possible that the spark does not have sufficient power to ignite the charge and this will tend to be the case when the mixture is weak. However, even when the mixture is relatively strong, if the weak spark initiates combustion, the time it takes for the peak pressure to occur is considerably longer for any weak spark than it is for a powerful spark. Therefore, the peak pressure generated by the main ignition system will overtake the peak pressure which would occur if only the weak spark caused the combustion. Therefore, the preliminary weak firing performed to establish a prediction of the burn period duration does not have a significant effect on the combustion process.

It is preferred that several weak sparks preceding the main spark be used in order to obtain a prediction of flame propagation speed. When several readings are taken, it is possible to extrapolate forward in time in order to estimate the gas velocity at the instant of the ignition. It is further possible to intercept spurious readings and prevent them from affecting the timing.

The closed loop control of the fuel to air ratio needs to have a long time constant because of the variations which would normally occur from one cycle to the next and by incorporating the feedforward control to reduce such variations, the accuracy of the feedback system is simultaneously enhanced.

I claim:

1. A method of engine control, characterised by the steps of firing a weak spark through a spark gap between two electrodes of a spark plug in a combustion cylinder of an internal combustion engine, measuring a current through or a voltage across the electrodes following the weak spark, analysing the voltage or current to derive a prediction of a flame propagation speed in the combustion cylinder and subsequently firing a stronger spark through the spark gap to ignite a combustion charge in the combustion cylinder, the stronger spark having an ignition timing varied in dependence upon the prediction of the flame propagation speed, and further including the step of firing several weak sparks in a single engine cycle to obtain several gas velocity readings, the readings being processed to provide by extrapolation an estimate of the gas velocity at the instant of the ensuing stronger spark.

2. A method as claimed in claim 1, characterised in that in order to obtain a parameter dependent upon actual burn period duration for closed loop control of the fueling of the engine, an ionisation current is additionally passed through the spark plug after ignition and the latter current is analysed to locate the timing of a spike superimposed on the trailing edge of the ionisation current.

3. A method as claimed in claim 2, wherein the ionisation current is analysed to detect on the trailing edge a high frequency component indicative of knock, the ignition being varied in dependence upon such detection to avoid engine damage.

* * * * *